United States Patent [19]

Savkar et al.

[11] Patent Number: 5,896,526
[45] Date of Patent: *Apr. 20, 1999

[54] PROGRAMMABLE INSTRUCTION TRAP SYSTEM AND METHOD

[75] Inventors: Sunil Savkar, New York, N.Y.; Gene W. Shen, Mountain View; Farnad Sajjadian, Sunnyvale, both of Calif.; Michael C. Shebanow, Plano, Tex.

[73] Assignee: Fujitsu, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/025,511

[22] Filed: Feb. 18, 1998

Related U.S. Application Data

[63] Continuation of application No. 08/456,746, Jun. 1, 1995.
[51] Int. Cl.$^6$ ........................................... G06F 11/00
[52] U.S. Cl. .................. 395/568; 395/591; 395/183.11; 395/183.14
[58] Field of Search .......................... 395/183.1, 183.11, 395/183.14, 568, 591, 739

[56] References Cited

U.S. PATENT DOCUMENTS

| | | | |
|---|---|---|---|
| 3,937,938 | 2/1976 | Matthews | 395/183.22 |
| 4,635,193 | 1/1987 | Moyer et al. | 364/200 |
| 4,905,242 | 2/1990 | Popp | 371/40.1 |
| 4,961,161 | 10/1990 | Kojima | 364/736.5 |
| 4,996,688 | 2/1991 | Byers et al. | 371/16.5 |
| 5,327,567 | 7/1994 | Johnson | 395/775 |
| 5,379,301 | 1/1995 | Sato et al. | 395/183.14 |
| 5,488,688 | 1/1996 | Gonzales et al. | 395/183.1 |
| 5,491,793 | 2/1996 | Somasundaram et al. | 395/183.11 |
| 5,557,762 | 9/1996 | Okuaki et al. | 395/375 |

FOREIGN PATENT DOCUMENTS

| | | |
|---|---|---|
| 0 271 910 A3 | 6/1988 | European Pat. Off. . |
| 0 636 976 A1 | 2/1995 | European Pat. Off. . |

OTHER PUBLICATIONS

J.T. Brady, *Compare and Conditionally Interrupt*, IBM Technical Disclosure Bulletin, vol. 20, No. 7, Dec. 1977.

*Primary Examiner*—William M. Treat
*Attorney, Agent, or Firm*—Fenwick & West LLP

[57] ABSTRACT

A system and method providing a programmable hardware device within a CPU. The programmable hardware device permits a plurality of instructions to be trapped before they are executed. The instructions that are to be trapped are programmable to provide flexibility during CPU debugging and to ensure that a variety of application programs can be properly executed by the CPU. The system must also provide a means for permitting a trapped instruction to be emulated and/or to be executed serially.

25 Claims, 7 Drawing Sheets

PROGRAMMABLE INSTRUCTION TRAP SYSTEM AND METHOD

Related Applications

This is a continuation of co-pending application Ser. No. 08/456,746 filed on Jun. 1, 1995, which is incorporated by reference herein in its entirety.

The subject matter of this application is related to the following applications:

application Ser. No. 08/457,049, abandoned in favor of FWC 08/926,185 entitled "METHOD AND APPARATUS FOR ROTATING ACTIVE INSTRUCTIONS IN A PARALLEL DATA PROCESSOR" filed on Sep. 8, 1987 by Sunil Savkar, Michael C. Shebanow, Gene W. Shen, and Farnad Sajjadian;

U.S. Pat. No. 5,689,673 entitled "Apparatus and Method for Controlling Instruction Flow by using a Matrix of Transmission Gates in Super-Scalar Microprocessor and Selectively Delaying Microprocessor Instruction Execution Based on Resource Availability" filed on Feb. 14, 1995 by Takeshi Kitahara;

application Ser. No. 08/388,389, now abandoned, entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/388,606, now abandoned, entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/388,364, now abandoned, entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/390,885, now abandoned, entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/397,893, now abandoned, entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

application Ser. No. 08/397,891, now abandoned, entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R. F. S. Szeto, Takumi Maruyama and DeForest W. Tovey;

U.S. Pat. No. 5,632,028 entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/398,284, now abandoned, entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/398,066, now abandoned, entitled "METHODS FOR UPDATING FETCH PROGRAM COUNTER" filed on Mar. 3, 1995 by Akira Katsuno, Niteen A. Patkar, Sunil Savkar and Michael C. Shebanow;

application Ser. No. 08/397,910 entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/398,151 abandoned in favor of FWC 08/956,251 entitled "METHOD AND APPARATUS FOR RAPID EXECUTION OF CONTROL TRANSFER INSTRUCTIONS" filed on Oct. 22, 1997 by Sunil W. Savkar;

U.S. Pat. No. 5,638,312 entitled "METHOD AND APPARATUS FOR GENERATING A ZERO BIT STATUS FLAG IN A MICROPROCESSOR" filed on Mar. 3, 1995 by Michael Simone;

U.S. Pat. No. 5,687,353 entitled "Merging Data Using a Merge Code from a Look-up Table and Performing ECC Generation of the Merged Data" filed on Mar. 3, 1995 by Chien Chen and Yizhi Lu; and application Serial Number 08/398,299, now abandoned, entitled "PROCESSOR STRUCTURE AND METHOD FOR TRACKING INSTRUCTION STATUS TO MAINTAIN PRECISE STATE" filed on Mar. 3, 1995 by Chien Chen, John R. F. S. Szeto, Niteen A. Patkar, Michael C. Shebanow, Hideki Osone, Takumi Maruyama and Michael A. Simone;

each of the above applications are incorporated herein by reference in their entirety.

BACKGROUND OF THE INVENTION

1. Field of the Invention

This invention relates generally to data processors. More particularly, this invention relates to a system and method for providing programmable hardware instruction traps in a microprocessor.

2. Description of Background Art

When designing a data processor it is important to rigorously test the design before tape-out. Generally, such testing attempts to identify errors in functional characteristics of the data processor. However, due to time limitations it is not always feasible to fully test all functional characteristics of the data processor design before tape-out. Tape-out occurs when the physical database design for manufacturing the parts, e.g., the data processor, is released.

Occasionally, functional errors in the design of the data processor are not discovered until after tape-out. In this circumstance it is expensive to correct the design and produce new data processor parts. Functional errors can also occur because of a flaw in manufacturing that effects certain instructions.

A related limitation occurs with superscalar central processing units (CPUs). Many software application programs are not developed for use in a superscalar environment. When a superscalar CPU executes instructions in such an application program some instructions may not perform in the manner they were designed.

What is needed is a system and method for providing a programmable hardware device within a CPU that permits a plurality of instructions to be trapped before they are executed. The instructions that are to be trapped are programmable to provide flexibility during CPU debugging and to ensure that a variety of application programs can be properly executed by the CPU. The system must also provide a means for permitting a trapped instruction to be emulated and/or to be executed serially.

SUMMARY OF THE INVENTION

The invention is a system and method that provides a programmable hardware device within a CPU. The programmable hardware device permits a plurality of instructions to be trapped before they are executed. The instructions that are to be trapped are programmable to provide flexibility during CPU debugging and to ensure that a variety of application programs can be properly executed by the CPU. The system must also provide a means for permitting a trapped instruction to be emulated and/or to be executed serially.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1:
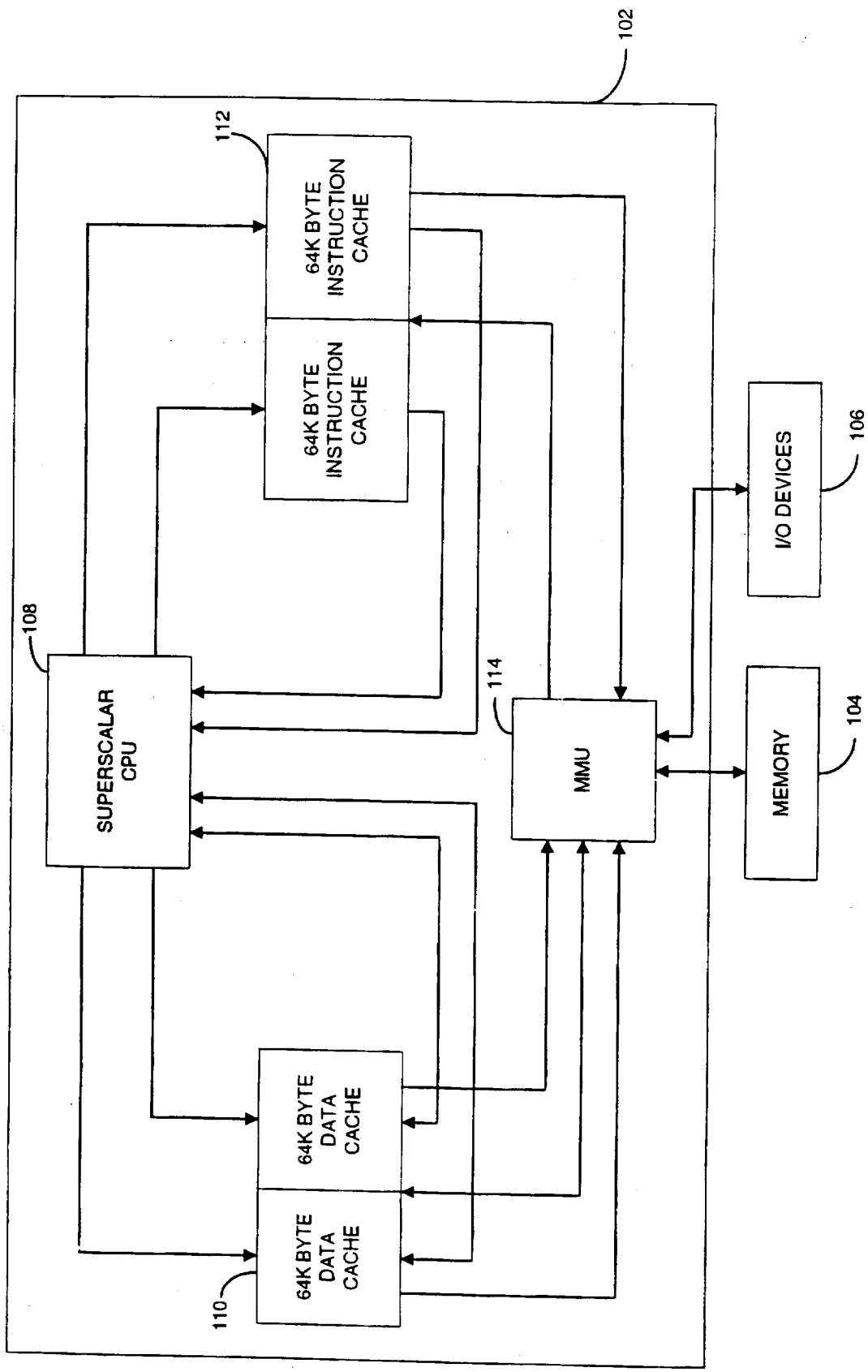
FIG. 1 is an illustration of a computer environment in which a preferred embodiment of the present invention resides.

FIG. 1 is an illustration of a computer environment in which a preferred embodiment of the present invention resides. A conventional memory unit 104 and conventional input/output (I/O) devices 106 communicate with a data processor 102. In the preferred embodiment the processor is a HaL R1 processor developed by HaL Computer Systems, Campbell, Calif. The HaL R1 processor implements the SPARC V9 64 bit instruction set architecture developed by SPARC International, Inc., Menlo Park, Calif. The processor 102 includes a superscalar CPU 108, a memory management unit (MMU), and four cache memory units 110, 112.

The cache memory units 110, 112 preferably include two 64 kilobyte (KB) conventional data caches and two 64 KB conventional instruction caches. The data caches 110 provide data to the superscalar CPU 108 and the MMU 114. Both sets of cache memory units 110, 112 are virtually indexed and tagged. Each cache chip 110, 112 contains 64 KB of data storage, organized as four sets. Each 64 KB cache chip 110, 112, can service two independent requests from the superscalar CPU 108. The interface between the superscalar CPU 108 and the caches 110, 112 is non-blocking in that the superscalar CPU 108 can access the cache 110, 112, at the same time a cache line is being refilled or flushed. Additional detail concerning the cache memory units 110, 112 is set forth in Chen, Chien, Y. Lu, A. Wond; *The Microarchitecture of the HaL Cache*, Compcon Proceedings 1995, which is incorporated herein by reference in its entirety.

The function of the MMU 114 includes controlling memory management and data coherence, interfacing to memory 104 and I/O devices 106, and error handling, for the processor 102. The MMU 114 includes three levels of address spaces: (1) a virtual address space for the processor 102, (2) a logical address space for I/O devices 106 and a diagnostic processor, and (3) a physical address space for memory 104. These hierarchical address spaces provide an efficient mechanism for managing the large address space. A more detailed description of the MMU 114 used in the preferred embodiment is described in David Chang, D. Lyon, C. Chen, L. Peng, M. Massoumi, M. Hakimi, S. Iyengar, E. Li, R. Remedios, *Microarchitecture of HaL's Memory Management Unit*, Compcon Proceedings 1995, which is incorporated herein by reference in its entirety.

Figure 2:
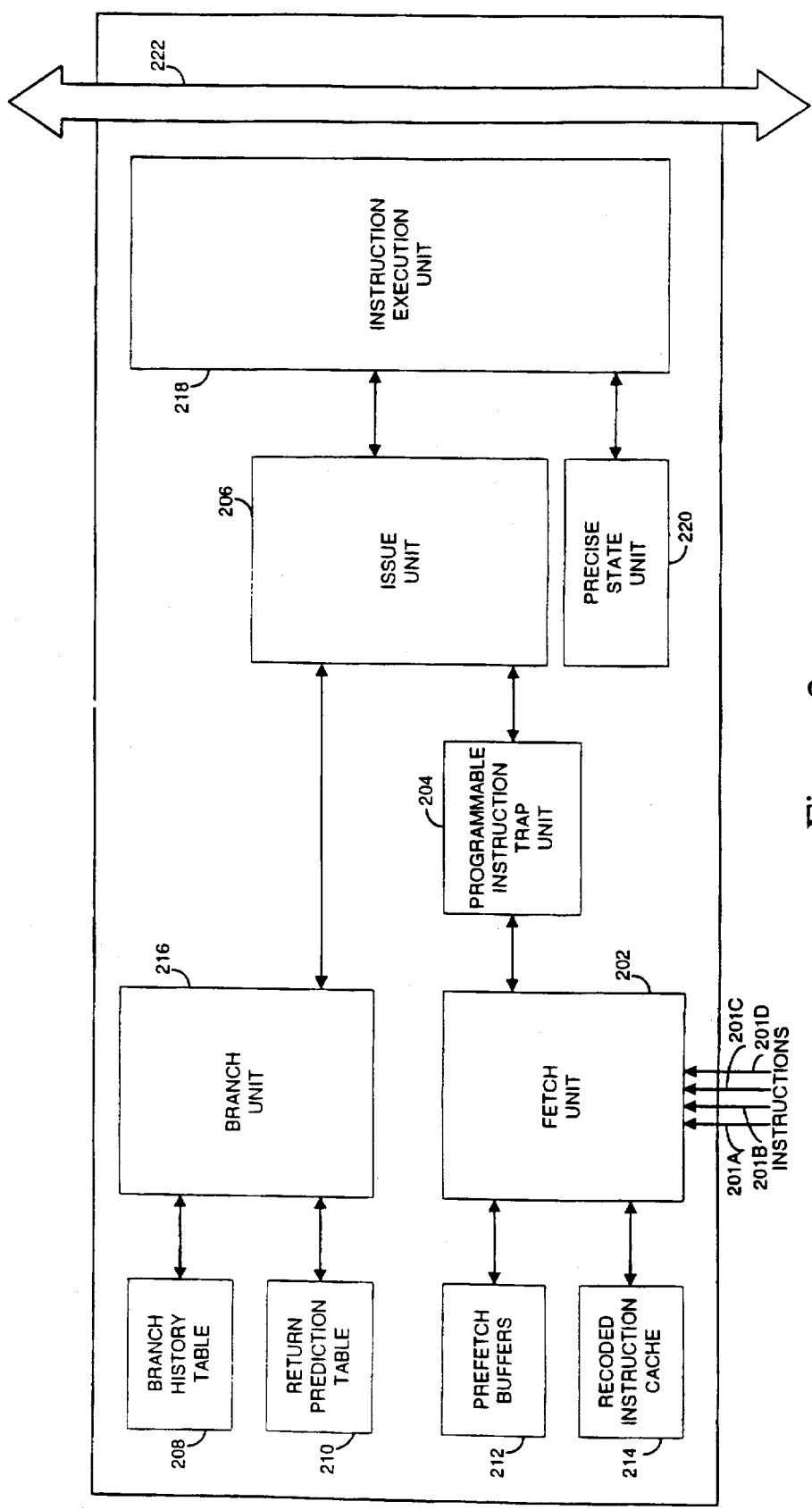
FIG. 2 is a more detailed illustration of a superscalar central processing unit of the preferred embodiment of the present invention.

FIG. 2 is a more detailed illustration of a superscalar CPU 108 of the preferred embodiment of the present invention. The processor 102 implements a four-stage pipeline for fixed-point instructions and a six-stage pipeline for "LOAD" instructions. The superscalar CPU 108 includes an instruction fetch unit 202, a programmable instruction trap unit 204, an instruction issue unit 206, an instruction execution unit 218, a precise state unit 220, a branch history table 208, a return prediction table 210, a prefetch buffer 212, a recoded instruction cache 214 and a branch unit 216.

The fetch unit 202 requests and receives four instructions from either the off-chip 64 KB instruction cache 112, shown as data lines 201 in FIG. 2, a prefetch buffer 212, or a recoded instruction cache 214. Four instructions are then sent to a programmable instruction trap unit 204 to determine if any of the instructions should be trapped. The programmable instruction trap unit 204 is described in greater detail below with reference to FIGS. 3–8. The branch history table 208 contains a plurality of counters that are used to predict the direction of execution branches. The return prediction table 210 is used to predict the return address of executed instructions. The branch unit 216 uses information from the issue unit 206, the branch history table 208, and the return prediction table 210, to determine if a control transfer instruction is within the current issue window, and further modifies the program counter if the control transfer instruction is taken. The issue unit 206 determines the available computer resources and issue constraints, e.g., should an instruction be synchronized. All instructions are issued by the issue unit 206 in the order they would have issued in a traditional serial processor and are sent to the instruction execution unit 218. The instruction execution unit 218 executes the instructions, although not necessarily in the order in which they were issued. The instruction execution unit 218 outputs the results of the instruction execution on data bus 222. A more detailed description of the superscalar CPU 108 of the preferred embodiment is described in Niteen Patkar, A. Katsuno, S. Li, T. Maruyama, S. Savkar, M. Simone, G. Shen, R. Swami, D. Tovey, *Microarchitecture of the HaL PM1 CPU*, Compcon Proceedings 1995. The present invention lies in the programmable instruction trap unit 204 which is herein described.

Figure 3:
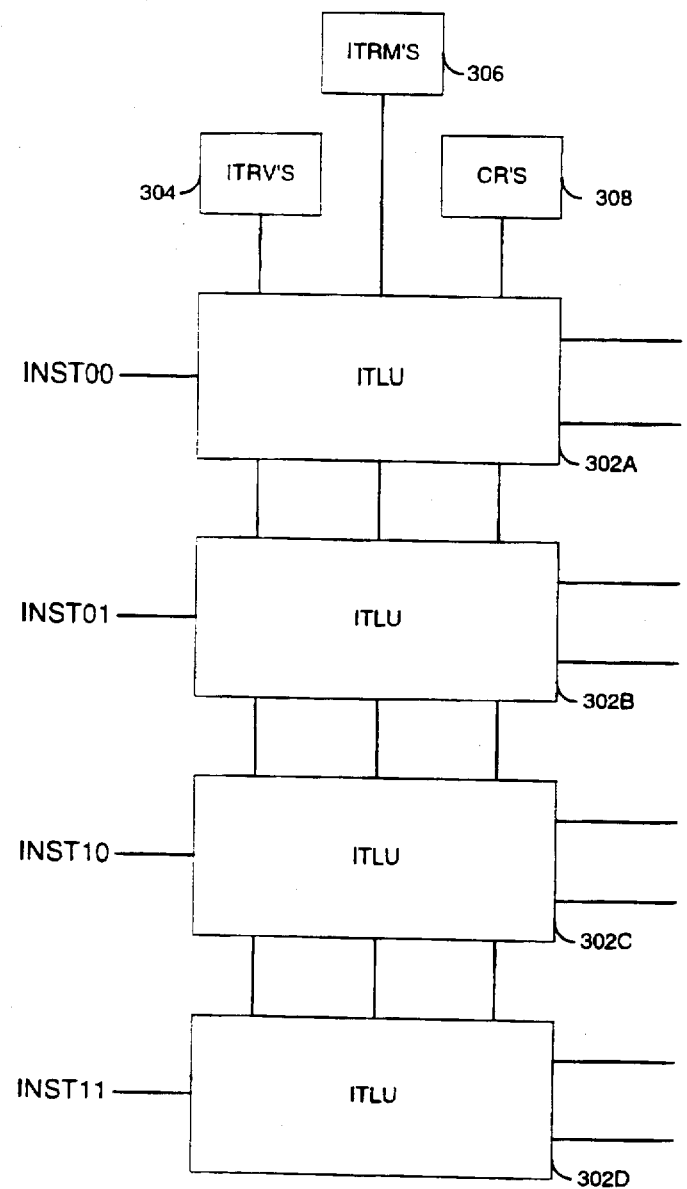
FIG. 3 is a more detailed illustration of a programmable instruction trap unit according to the preferred embodiment of the present invention.

FIG. 3 is a more detailed illustration of a programmable instruction trap unit 204 according to the preferred embodiment of the present invention. The programmable instruction trap unit 204 preferably receives four instructions from the fetch unit 202. The instructions are shown on FIG. 3 as INST00, INST01, INST10, INST11. Each instruction is sent to an instruction trap logic unit (ITLU) 302. The instruction trap logic unit also receives signals from preferably four instruction trap register's (ITRV) 304, four instruction trap register masks (ITRM) 306, and four control registers (CR) 308. A more detailed description of the instruction trap logic unit 302, ITRM 304, ITRM 306 and CR 308 are set forth below with respect to FIGS. 4–8.

Figure 4:
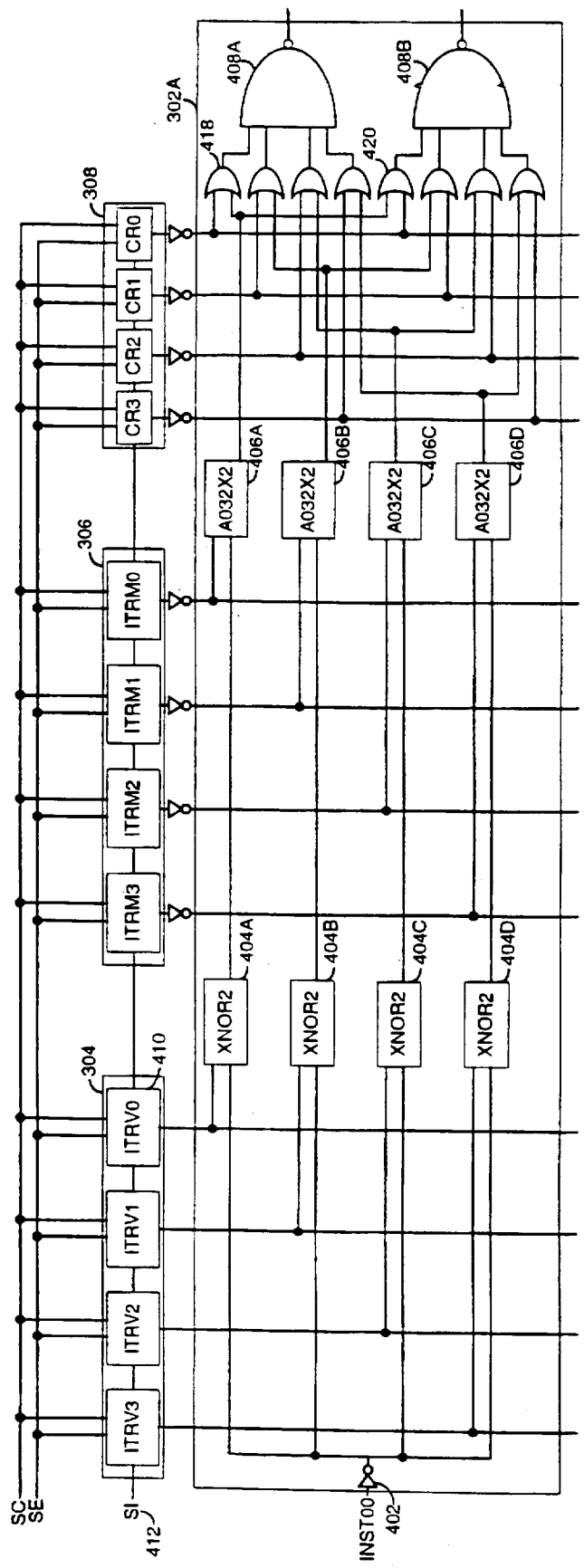
FIG. 4 is a more detailed illustration of a programmable instruction trap unit according to the preferred embodiment of the present invention.

FIG. 4 is a more detailed illustration of a programmable instruction trap unit according to the preferred embodiment of the present invention. The instruction trap logic unit 302 preferably includes four Exclusive NOR logic devices 404A–D, where one Exclusive NOR is associated with each ITRV 304. Each Exclusive NOR device 404 compares each inverted bit of the instruction with a corresponding bit from the associated ITRV, e.g., ITRV0 410, and for each bit the NOR device 404 outputs a value indicating whether a match has occurred. It is envisioned that other techniques can be used to compare each bit of the instruction, INST00, with each bit in an ITRV 304. The method for performing this comparison is described in greater detail below with respect to FIGS. 7–8.

The instruction trap logic unit 302 preferably includes four devices 406A-D that compare each bit output by an associated Exclusive NOR device 404 with a bit value in an ITRM 306. Each ITRM 306 contains a plurality of bits containing a "care" or "don't care" value. Each of the four devices 406A–D compares a bit that is output by its associated Exclusive NOR device and a bit in its associated ITRM 306. Each device 406 outputs a one bit value representing whether all of the instruction bits match the associated ITRV-ITRM register pair. Preferably, each device 406 is an AO32×2 device. This device has two sets of 32 bit inputs, one set coupled to each bit line of the associated Exclusive NOR 404 output, the other set coupled to the associated ITRM 306. The AO32×2 includes 32 logical AND gates whose outputs are input into a logical OR gate. The method for performing this comparison is described in greater detail below with respect to FIGS. 7–8.

The CR's 308 are associated with a single ITRV-ITRM pair. For example, CR0 is associated with ITRV0 and ITRM0. Each CR contains data representing the action that is to be taken if the instruction matches its associated ITRV-ITRM register pair. Although each control register can contain any number of bits, in the preferred embodiment each CR 308 contains two bits. One bit represents a synchronization action, the other bit represents an instruction trap. That is, if the bits in a control register are "00" and if the instruction matches the associated ITRV-ITRM register pair 304, 306, then no special action is taken. If the bits in a control register are "01" and if the instruction matches the associated ITRV-ITRM register pair 304, 306, then the programmable instruction trap unit 204 will output a signal that causes the matched instruction to execute synchronously, i.e., all instructions that are issued before the matched instruction will have completed execution and the machine will be in a committed, i.e., known, state before the matched instruction executes. In addition, a synchronization instruction is issued, executed, completed and committed before any subsequent instructions are issued. If the bits in a control register are "10" and if the instruction matches the associated ITRV-ITRM register pair 304, 306, then the programmable instruction trap unit 204 will generate a non-synchronizing instruction issue trap, i.e., the instruction will take on the semantics of an instruction trap. If the bits in a control register are "11" and if the instruction matches the associated ITRV-ITRM register pair 304, 306, then the programmable instruction trap unit 204 will generate a synchronizing instruction issue trap, i.e., the instruction will be trapped and executed synchronously.

The instruction trap logic unit 302 includes a device for generating the values stored in the CR 308 associated with an ITRV-ITRM register pair 304, 306 that matches the received instruction, e.g., INST00. A variety of techniques can be utilized to generate this value. Preferably, two sets of four logical OR gates (one associated with each CR 308) receive an input from the CR 308. Each OR gate of the first set of OR gates receives two inputs: (1) the first bit of a CR 308, e.g., CR0, and (2) the one bit output from the AO32×2 associated with the CR 308. Similarly, each OR gate of the second set of OR gates receives two inputs: (1) the second bit of a CR 308, e.g., CR0, and (2) the one bit output from the AO32×2 associated with the CR 308. The output of all of the OR gates for each set of OR gates is supplied to a logical NAND gate, 408A–B. The method for generating the outputs of the instruction trap logic unit 302 is described in greater detail below with respect to FIGS. 7–8.

The values in the ITRV's 304, the ITRM's 306, and the CR's 308 are programmable. These values can be programmed by a user to trap instructions and cause certain instructions to be executed synchronously, as described above. The programmability feature of the present invention provides an efficient technique for trapping and synchronizing instructions in order to correct functional errors in processor instructions and ensure the proper operation of application programs by executing certain instructions synchronously, i.e., those instructions stored in the ITRV 304, ITRM 306. A variety of techniques can be used to program the ITRV's 304, the ITRM's 306, and the CR's 308 (collectively called the programmable registers). For example, the programmable registers can be coupled to a data bus and to control logic that permits the programmable registers to receive data from the data bus. In the preferred embodiment the data is "scanned-in" during the computer boot-up operation. The programmable registers are programmed using a technique similar to shift registers.

Figure 5:
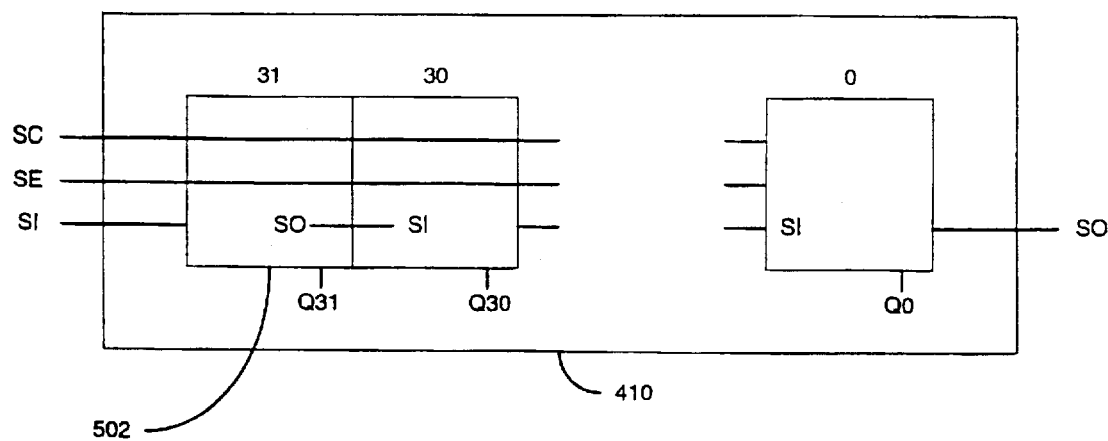
FIG. 5 is a more detailed illustration of an Instruction Trap Register Value (ITRV) and an Instruction Trap Register Mask (ITRM) according to the preferred embodiment of the present invention.

FIG. 5 is a more detailed illustration of an ITRV 304 and ITRM 306 according to the preferred embodiment of the present invention. Each programmable register 410 contains a plurality of bit registers 502. Preferably, each ITRV 304 and each ITRM 306 include 27 bit registers 502 while each CR 306 includes 2 bit registers 502. FIG. 5 is a representative ITRV 304 or an ITRM 306. The CR's 308 operate in the same manner with the exception that each CR 308 preferably includes two bit registers 502 as opposed to 27 bit registers 502, as discussed above. Each programmable register 410 receives a scan clock (SC) signal, a scan-enable (SE) signal, and scan-input (SI) signal, and generates a scan-output (SO) signal and a Q output signal.

Figure 6:
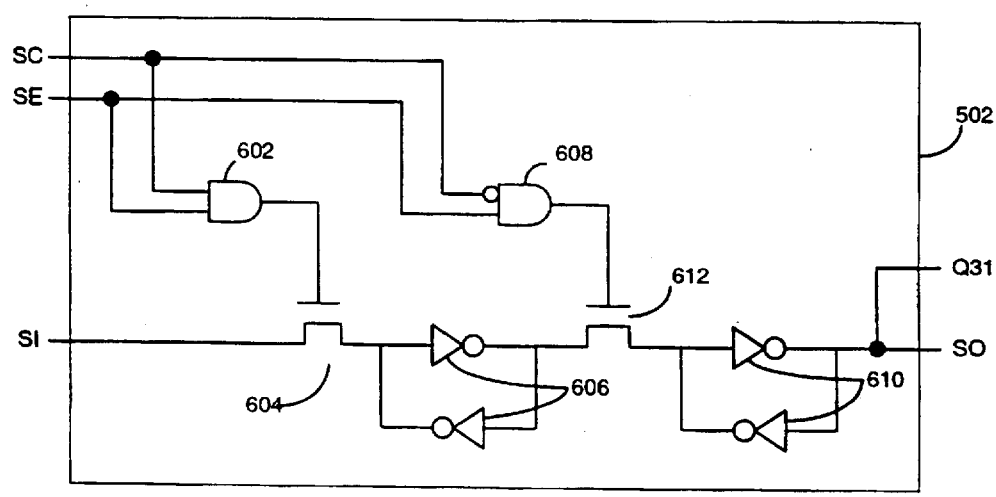
FIG. 6 is a more detailed illustration of a bit register according to the preferred embodiment of the present invention.

FIG. 6 is a more detailed illustration of a bit register 502 according to the preferred embodiment of the present invention. A signal containing a bit value is received on the SI line. When the SC and SE signals are high, i.e., the signal represents a binary "1" value, the logical AND gate 602 generates a high signal. This signal is coupled to the gate of transistor 604. As a result, transistor 604 conducts thereby enabling the signal on the SI line to pass through the transistor 604 and have its logic value be maintained by two inverters 606. When the SC goes low while the SE signal remains high transistor 604 turns off and the logical AND gate 608 generates a high signal. The AND gate 608 is coupled to the gate of transistor 610. As a result, transistor 612 conducts and the inverted SI signal is again inverted by one of the inverters 610 and is output on the SO line. The signal is also output on the Q line that is coupled to either device 404A if the bit register is part of an ITRV 304, an inverter and device 406A if the bit register is part of an ITRM 306, or an inverter and an OR gate if the bit register is part of a CR 308. The SO line is coupled to the next bit register SI line. The SO line of the last bit register of ITRV 304 is coupled to the first bit register of the first ITRM 306. The last bit register of ITRM 306 is coupled to the first bit register of the first CR 308. During the computer initialization process data representing the programmable register values are systematically input into the first SI line 412 and shifted through all of the bit registers until each programmable register contains the desired values, i.e., the bit register values are scanned-in.

Figure 7:
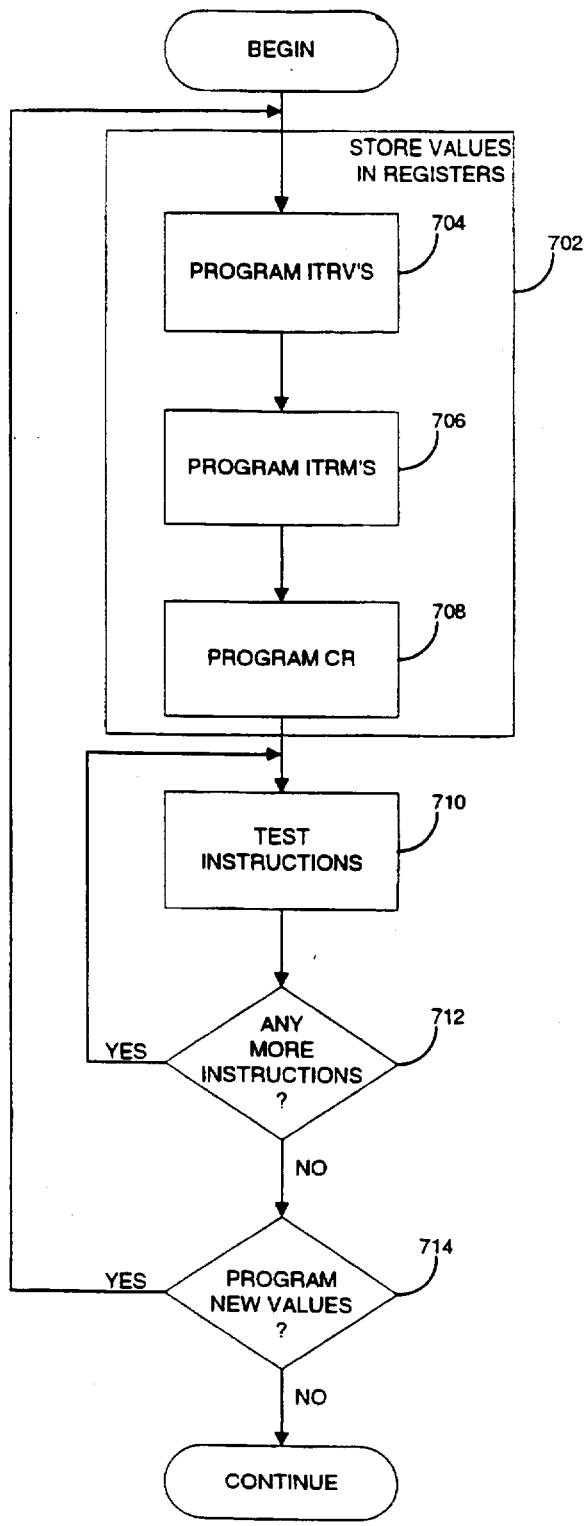
FIG. 7 is a flow diagram describing the method of trapping an instruction according to the preferred embodiment of the present invention.

The method of the present invention will now be described. FIG. 7 is a flow diagram describing the method of trapping an instruction according to the preferred embodiment of the present invention. Initially, the ITRV's 304, the ITRM's 306, and the CR's 308 are programmed. As described above, these programmable registers can be programmed individually 704, 706, 708, using a data bus and control signals. Preferably, the programmable registers are programmed during computer initialization using the scan-in, i.e., bit shifting, technique described above with reference to FIGS. 5–6. After the programmable registers are programmed 702 instructions are tested 710. The method for testing instructions is set forth below with respect to FIG. 8.

Figure 8:
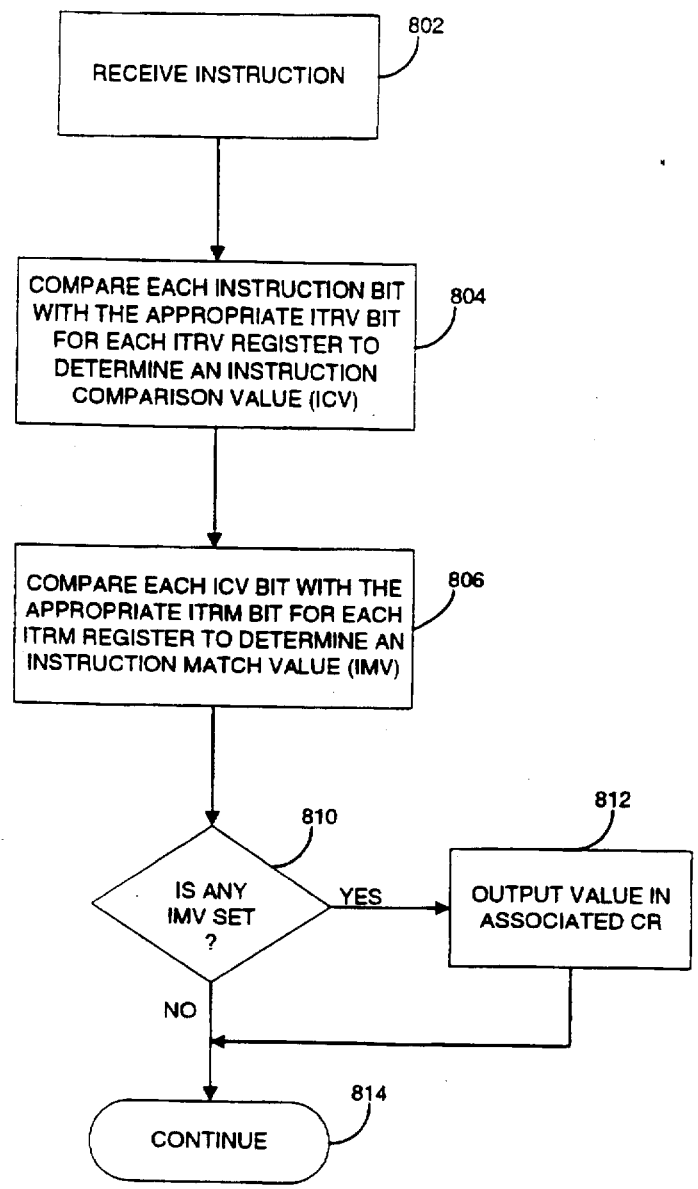
FIG. 8 is a flow diagram describing the method of testing an instruction according to the preferred embodiment of the present invention.

FIG. 8 is a flow diagram describing the method of testing an instruction according to the preferred embodiment of the present invention. Preferably four instructions are received 802 by the programmable instruction trap unit 204 from the fetch unit 202, as illustrated in FIG. 2. Each instruction is sent to a separate instruction trap logic unit 302. For example, instruction INST00 is sent to instruction trap logic unit 302A. The instruction trap logic unit 302A inverts each bit in the instruction using inverter 402. The inverted instruction bits are received by four exclusive NOR device 404A-D, described above with reference to FIG. 4. Each exclusive NOR device 404 compares 804 each inverted instruction bit with a corresponding bit in one of the ITRV's 304 that was previously programmed. For example, the exclusive NOR device 404A, compares instruction bit 0 with bit register 0 of ITRV0, as illustrated in FIGS. 4–6. If the inverted instruction bit matches the associated bit in one of the ITRV's 304 then the exclusive NOR generates a signal representing a logical "1". Otherwise, the exclusive NOR generates a signal representing a logical "0". Since the exclusive NOR device is comparing the associated ITRV bit register 502 and an inverted bit of the instruction, if the exclusive NOR generates a signal representing a logical "0" then the ITRV bit matches the instruction bit. Each inverted bit of the instruction, INST00, is compared to each associated bit of each ITRV 304. Preferably, the result of these comparisons is four 27-bit signals representing the result of the exclusive NOR comparison of devices 404A–D.

Preferably, each bit in each set of 27-bit signals is compared 806 with a bit register 502 in an associated ITRM 306 using an AO32×2 device 406A-D. Each AO32×2 device 406A–D consists of at least 27 logical AND gates whose outputs are input into a logical OR gate. For example, the least significant bit, or the zero bit, that is output from device 404A is input into an AND gate along with the inverted zero bit register of ITRM0. The ITRM's 306 are a mask. Sometimes it is desirable to compare each instruction with a set of related instruction patterns. For example, it may be desirable to match all instructions having a certain combination of bits 5–9. In this situation the remaining bits, e.g., bits 0–4 and 10–26, should be masked because their value is irrelevant for this particular match. This matching is accomplished by placing a "don't care" value in the proper ITRM bit register. In the present invention, the "don't care" value is a logical "1". As illustrated in FIG. 4, the ITRM values are inverted before they are received by the AO32×2. Accordingly, if a bit from device 404A is either zero, because the instruction bit matched the associated ITRV bit register, the output of the associated AND gate in the AO32×2 406A will be zero. Similarly, if a bit from device 404A is a logical one, then the output of the AND will be zero only if the associated bit register in ITRM0 is masked, i.e., it's inverted value is equal to zero.

As discussed above, all of the AND gate outputs are coupled to an OR gate. If any AND gate output is a logical one then the output of the OR gate is a logical one. The output of the OR gate is the output of the AO32×2 406. Therefore, the AO32×2 406 generates an instruction match value (IMV) signal that represents a logical zero only if all of the bits from the instruction INST00 either match the associated ITRV bits or are masked, i.e., if the instruction INST00 matches the ITRV-ITRM 304, 306 register pair.

The programmable instruction trap unit 204 then determines 810 if any matches have occurred and if so it generates 812 the value in the associated CR 308. The process for achieving this is now described. The output from each AO32×2 device 406 is received by two logical OR gates, e.g., OR gates 418, 420, as illustrated in FIG. 4. The second input to the first OR gate 418 is the value of the first bit register of the associated CR 308. The second input to the second OR gate 420 is the value of the second bit register of the associated CR 308. For example, if instruction INST00 only matches the register pair ITRV0-ITRM0 then AO32×2 406A generates a signal representing a logical zero at its output and the remaining AO32×2 406B-D generate a signal representing a logical one at its output. The three OR gates associated with AO32×2's 406B–D receive a binary one as one of its inputs. Accordingly, these three OR gates will output a signal representing a binary one. NAND gate 408A will generate a logical zero output only if the output of OR gate 418 generates a logical one. Since the output of device 406A is a logical zero, the output of OR gate 418 is a logical one only if the first bit register of CR0 contains a logical zero. Each set of four OR gates and one NAND gate 408 result in either (1) the value of the CR 308 associated with a matching register pair to be output by the NAND gates 408A–B, or (2) if the instruction INST00 does not match any register pair, the NAND gates 408A–B output a "00" value representing that no special action is to be taken, as described above.

All four received instructions, i.e., INST00, INST01, INST10, and INST11 are similarly compared to each of the four ITRV registers and the ITRM registers.

It is possible for more than one register pair to match a single instruction. For example, both the register pair ITRV1-ITRM1 and the register pair ITRV2-ITRM2 can match a particular instruction, e.g., INST00. In such a circumstance a bit value of "1" in a CR bit register for one CR, e.g., CR2, will result in the associated NAND gate generating a signal representing a logical one.

After all four instructions are concurrently tested the method continues 814. If more instructions are received 712 the process repeats. After all instructions have been tested new values for the ITRV's 304, ITRM's 306, and CR's 308 can be programmed 714 in using a data bus or preferably by rebooting the computer and scanning in new programmable register values, as described above, and then the process 702–714 repeats.

While the invention has been particularly shown and described with reference to a preferred embodiment and several alternate embodiments thereof, it will be understood by persons skilled in the relevant art that various change in form and details can be made therein without departing from the spirit and scope of the invention.

What is claimed is:

1. Microprocessor, comprising:

an instruction fetch unit, disposed to receive a plurality of computer instructions, for retrieving said plurality of computer instructions; and a programmable instruction trap unit, coupled to said fetch unit, for comparing each of said computer instructions with one of a plurality of programmable values, and for generating an instruction trap control signal for each of said instructions representing a function to be performed for each of said computer instructions in response to said comparisons, said programmable instruction trap unit including:

a plurality of first programmable registers, each of said first programmable registers for automatically receiving and storing a first value representing one or more trap instructions that a user wants to trap, said first value is programmable by said user;

a plurality of first comparators, each disposed to receive one of said computer instructions and one of said programmable register values, for determining if said computer instruction matches said programmable register value;

a plurality of programmable control registers, each of said programmable control registers associated with one of said first programmable registers, for storing a second value representing a function to be performed if said first comparator determines said computer instruction matches said programmable register value; and a plurality of control units, each coupled to said programmable control registers for generating a plurality of signals representing said second value if one of said first programmable registers matches one of said computer instructions.

2. The microprocessor of claim 1, wherein each of said first comparators comprises:

a second comparator, disposed to receive said computer instruction; and a third comparator, coupled to said control unit and disposed to receive an output of said second comparator.

3. The microprocessor of claim 2, wherein each of said first programmable registers includes:

a value register, coupled to said second comparator, for storing data representing one or more of said trap instructions;

a mask register coupled to said third comparator, for storing mask information associated with said value register, each bit of said mask information represents one of a mask bit indicator and a don't mask bit indicator.

4. The microprocessor of claim 3, wherein said second comparator compares each bit of said computer instruction with an associated bit of said value register and generates a first bit value representing the second comparator result.

5. The microprocessor of claim 4, wherein said third comparator compares each first bit value output with an associated bit from said mask register and generates a second bit value representing the third comparator result.

6. The microprocessor of claim 4, wherein said third comparator compares all of said first bit values output by said second comparator with all associated bits of said mask register and generates matching signal if all bit comparisons match.

7. The microprocessor of claim 2, wherein four instructions are simultaneously compared with all of said first programmable registers.

8. A method for identifying computer program instructions in a microprocessor comprising a plurality of first registers, second registers, and control registers, comprising the steps of:

programming all bits in said plurality of first registers, said plurality of second registers, and said plurality of control registers;

receiving a plurality of instructions having a plurality of bits;

performing a first comparison of each bit of each instruction with an associated bit of each of said first registers;

generating a first bit value for each of said first comparisons;

performing a second comparison of each of said first bit values with an associated bit of said second register that is associated with said first bit value; and generating a signal representing the contents of an associated control register if said instruction satisfies said second comparison.

9. The method of claim 8 wherein each of said plurality of first registers store a first computer program instruction representation.

10. The method of claim 8 wherein each of said plurality of second registers store mask bits for identifying bits of said instruction that are relevant for said second comparison.

11. The method of claim 8 wherein each of said plurality of control registers identifies a location in a memory device at which an alternate computer program is stored that corresponds to the action to be taken if said instruction matches said second comparison.

12. The method of claim 8, wherein said step of programming all bits in said plurality of first registers, said plurality of second registers, and said plurality of control registers includes the step of:

scanning in all of the values for said first registers, said second registers, and said control registers.

13. The method of claim 12, wherein said scanning step includes the step of:

sequentially receiving binary values and storing the values in said first registers, second registers, and control registers.

14. A microprocessor for identifying computer program instructions comprising:

a plurality of first registers;

a plurality of second registers;

a plurality of control registers, programming means for programming all bits in said plurality of first registers, said plurality of second registers, and said plurality of control registers;

instruction receiving means for receiving a plurality of instructions having a plurality of bits;

first comparison means, coupled to said first registers and said instruction receiving means, for performing a first comparison of each bit of each instruction with an associated bit of each of said first registers;

first generation means, coupled to said first comparison means, for generating a first bit value for each of said first comparisons;

second comparison means, coupled to said first generation means, for performing a second comparison of each of said first bit values with an associated bit of said second register that is associated with said first bit value; and second generation means, coupled to said second comparison means, for generating a signal representing the contents of an associated control register if said instruction satisfies said second comparison.

15. The microprocessor of claim 14 wherein each of said plurality of first registers store a first computer program instruction representation.

16. The microprocessor of claim 14 wherein each of said plurality of second registers store mask bits for identifying bits of said instruction that are relevant for said second comparison.

17. The microprocessor of claim 14 wherein each of said plurality of control registers identifies a location in a memory device at which an alternate computer program is stored that corresponds to the action to be taken if said instruction matches said second comparison.

18. The microprocessor of claim 14, wherein said step of programming all bits in said plurality of first registers, said plurality of second registers, and said plurality of control registers includes the step of:

scanning in all of the values for said first registers, said second registers, and said control registers.

19. The microprocessor of claim 18, wherein said scanning step includes the step of:

sequentially receiving binary values and storing the values in said first registers, second registers, and control registers.

20. The microprocessor of claim 1, further including:

an issue unit, coupled to said programmable instruction trap unit, for receiving said instruction trap control signal, said issue unit executing said function in an asynchronous manner.

21. A computer processing system capable of executing computer instructions asynchronously, comprising:

an instruction fetch unit, disposed to receive a plurality of computer instructions, for retrieving said plurality of computer instructions; and a programmable instruction trap unit, coupled to said fetch unit, for comparing each of said computer instructions with one of a plurality of programmable values, and for generating an instruction trap control signal for each of said instructions representing an emulation routine to be performed instead of said computer instructions in response to said comparisons, said programmable instruction trap unit including:

a plurality of first programmable registers, each of said first programmable registers for storing a first value representing one or more trap instructions that a user wants to trap, said first value is programmable by said user;

a plurality of first comparators, each disposed to receive one of said computer instructions and one of said programmable register values, for determining if said computer instruction matches said programmable register value;

a plurality of programmable control registers, each of said programmable control registers associated with one of said first programmable registers, for storing a second value representing a trap synchronizing function to be performed if said first comparator determines said computer instruction matches said programmable register value; and a plurality of control units, each coupled to said programmable control registers, for generating a plurality of signals representing said second value if one of said first programmable registers matches one of said computer instructions.

22. The computer processing system of claim 21, wherein each of said first comparators comprises:

a second comparator, disposed to receive said computer instruction; and a third comparator, coupled to said control unit and disposed to receive an output of said second comparator.

23. The computer processing system of claim 21, wherein each of said first programmable registers includes:

a value register, coupled to said second comparator, for storing data representing one or more of said trap instructions;

a mask register coupled to said third comparator, for storing mask information associated with said value register, each bit of said mask information represents one of a mask bit indicator and a don't mask bit indicator.

24. The computer processing system of claim 23, wherein said second comparator compares each bit of said computer instruction with an associated bit of said value register and generates a first bit value representing the second comparator result.

25. The computer processing system of claim 24, wherein said third comparator compares each first bit value output with an associated bit from said mask register and generates a second bit value representing the third comparator result.

* * * * *